UNITED STATES PATENT OFFICE.

ARTHUR BOEGLIN, OF LUCERNE, ASSIGNOR TO KNOLL & CO., OF LIESTHAL, SWITZERLAND.

ANTIPYRIN COMPOUND.

SPECIFICATION forming part of Letters Patent No. 548,352, dated October 22, 1895.

Application filed February 13, 1895. Serial No. 538,196. (Specimens.)

*To all whom it may concern:*

Be it known that I, ARTHUR BOEGLIN, chemist, a citizen of the French Republic, residing at Lucerne, Switzerland, have invented new and useful Improvements in the Manufacture of Medicinal Preparations, of which the following is a specification.

I have discovered that by the combination of antipyrine (dimethylphenylpyrazolone) with the salts of iron solid crystallized compounds can be obtained which are applicable in medicine and pharmacy as remedies for anæmia, chlorosis, megrim, neuralgia, &c.

By way of example I will describe the production of the compound obtained by the combination of antipyrine with ferric chlorid. Five hundred and sixty-four grams of antipyrine are dissolved in five hundred and sixty-four grams of water. To this there are added five hundred and forty-one grams of crystallized chlorid of iron (ferric chlorid) dissolved in five hundred and forty-one grams of water. On stirring there becomes separated a hard reddish brick-colored crystallized mass, which is separated from the mother-liquor and is washed with a little water. This is a double salt of antipyrine and ferric chlorid.

The compound of antipyrine and ferric chlorid thus produced consists of one molecule of chlorid of iron (ferric chlorid) and three molecules of antipyrine. Its composition $(C_{11}H_{12}N_2O)_3Fe_2Cl_6$ is confirmed by analysis. It contains twelve per cent. of iron, sixty-four per cent. of antipyrine, and twenty-four per cent. of chlorin. Its chemical individuality is proved by its ready capability of crystallizing and by its properties, which are totally different from those of its constituents.

It forms crystals which are brittle, non-hygroscopic, and of a reddish brick color, and which do not give up any hydrochloric acid when heated. It is soluble in five parts of water with a Bordeaux-red color. Its melting-point is 225° centigrade, at which temperature it blackens and becomes decomposed.

This compound of antipyrine and ferric chlorid is applicable as a remedy for anæmia, chlorosis, megrim, neuralgia, &c., and can also be employed as a styptic.

The production of the other compounds of antipyrine with the salts of iron oxides is effected in an analogous manner, and all these compounds are intended to be used for pharmaceutical purposes.

What I claim as new, and desire to secure by Letters Patent, is—

1. The process of manufacture of a compound for use in medicine and pharmacy, by the combination of three molecules of antipyrine with one molecule of ferric chlorid, as described.

2. As a new article of manufacture, the herein described compound of antipyrine and ferric chlorid, which constitutes brittle, non-hygroscopic crystals of a reddish brick color, is soluble in water with a Bordeaux-red color and does not give up hydrochloric acid, when heated.

3. As a new medicinal compound, a double salt of antipyrine and ferric chlorid containing three molecules of antipyrine and one molecule of the chlorid, said double salt consisting of brittle, non-hygroscopic crystals of a reddish brick color which, when dissolved in water form a Bordeaux-red solution, and which yield no hydrochloric acid when heated.

In witness whereof I have hereunto signed my name in the presence of two subscribing witnesses.

ARTHUR BOEGLIN.

Witnesses:
 JOSEF LINSON,
 EDWARD LINSON.